(12) United States Patent
Barnes

(10) Patent No.: US 8,847,098 B2
(45) Date of Patent: Sep. 30, 2014

(54) PLANETARY RESISTANCE WELDING DEVICE AND METHODS THEREFOR

(75) Inventor: Vaughn V. Barnes, Corona Del Mar, CA (US)

(73) Assignee: Thermal Structures, Inc., Corona, CA (US)

(*) Notice: Subject to any disclaimer, the term of this patent is extended or adjusted under 35 U.S.C. 154(b) by 35 days.

(21) Appl. No.: 13/393,723

(22) PCT Filed: Jul. 22, 2010

(86) PCT No.: PCT/US2010/042929
§ 371 (c)(1),
(2), (4) Date: Apr. 10, 2012

(87) PCT Pub. No.: WO2011/028333
PCT Pub. Date: Mar. 10, 2011

(65) Prior Publication Data
US 2012/0273469 A1    Nov. 1, 2012

Related U.S. Application Data

(60) Provisional application No. 61/239,716, filed on Sep. 3, 2009.

(51) Int. Cl.
*B23K 11/06* (2006.01)
*B23K 11/00* (2006.01)

(52) U.S. Cl.
CPC ............ *B23K 11/002* (2013.01); *B23K 11/065* (2013.01)
USPC ............... 219/84; 219/81; 219/60 A; 219/64; 219/76.16; 219/121.64

(58) Field of Classification Search
CPC .... B23K 11/06; B23K 11/062; B23K 11/063; B23K 11/065; B23K 11/066; B23K 11/067; B23K 11/068
USPC .................. 219/59.1, 67, 81–84, 119, 76.16; 74/412 R, 413, 421 R
See application file for complete search history.

(56) References Cited

U.S. PATENT DOCUMENTS

| | | | | |
|---|---|---|---|---|
| 1,601,927 | A | * | 10/1926 | Tobey .............................. 219/81 |
| 2,323,903 | A | * | 7/1943 | Fentress .......................... 219/66 |
| 2,545,284 | A | | 3/1951 | Jones |
| 2,809,276 | A | | 10/1957 | Smith |
| 2,854,561 | A | * | 9/1958 | Gold ............................... 219/83 |
| 3,209,118 | A | * | 9/1965 | Dyer et al. .................. 219/60 A |
| 3,536,879 | A | * | 10/1970 | Sirois et al. ................. 219/60 A |
| 3,789,181 | A | * | 1/1974 | Netterstedt et al. ............. 219/62 |
| 3,823,299 | A | * | 7/1974 | Metcalfe et al. ................ 219/83 |
| 3,844,468 | A | * | 10/1974 | Nelson et al. ................... 228/13 |

(Continued)

FOREIGN PATENT DOCUMENTS

| EP | 0273607 | 6/1991 |
|---|---|---|
| GB | 1136735 | 12/1968 |
| WO | WO 2011028333 A1 * | 3/2011 |

*Primary Examiner* — Dana Ross
*Assistant Examiner* — Gyounghyun Bae
(74) *Attorney, Agent, or Firm* — Fish & Tsang LLP

(57) ABSTRACT

Devices and methods are contemplated in which a first electrode is circumferentially movable about a second electrode such that a tubular work piece can be resistance welded to a second work piece. Most preferably, the first electrode is a wheel-shaped electrode, while the second electrode is static and disk-shaped.

12 Claims, 3 Drawing Sheets

(56) References Cited

U.S. PATENT DOCUMENTS

| | | | |
|---|---|---|---|
| 3,881,083 A * | 4/1975 | Bromley | 219/84 |
| 3,904,845 A * | 9/1975 | Minkiewicz | 228/176 |
| 4,132,338 A * | 1/1979 | Bove et al. | 228/27 |
| 4,379,215 A * | 4/1983 | Rohrberg | 219/60 A |
| 4,661,673 A | 4/1987 | Geiermann | |
| 4,760,234 A * | 7/1988 | Urech et al. | 219/83 |
| 4,780,589 A * | 10/1988 | Davies | 219/84 |
| 4,804,813 A * | 2/1989 | Tesch | 219/60 A |
| 5,017,749 A * | 5/1991 | Boyd et al. | 219/64 |
| 5,347,099 A * | 9/1994 | Gissinger et al. | 219/81 |
| 5,676,858 A | 10/1997 | Gantenbein | |
| 5,676,862 A * | 10/1997 | Matteson | 219/110 |
| 6,259,052 B1 * | 7/2001 | Ding et al. | 219/59.1 |
| 6,281,467 B1 | 8/2001 | Gould et al. | |
| 6,323,453 B1 | 11/2001 | VanOtteren | |
| 6,466,004 B1 * | 10/2002 | Rogers et al. | 324/117 H |
| 6,875,944 B2 * | 4/2005 | Ananthanarayanan et al. | 219/76.16 |
| 2002/0005393 A1 * | 1/2002 | Rohrberg | 219/60 A |
| 2005/0045596 A1 * | 3/2005 | Oyster et al. | 219/60 A |
| 2006/0043076 A1 * | 3/2006 | Larsson et al. | 219/121.64 |
| 2006/0118526 A1 * | 6/2006 | McGushion | 219/60 A |
| 2006/0150388 A1 | 7/2006 | Inada et al. | |
| 2007/0007254 A1 | 1/2007 | Wang et al. | |
| 2007/0262056 A1 | 11/2007 | Schwaegler et al. | |
| 2012/0273469 A1 * | 11/2012 | Barnes | 219/84 |

* cited by examiner

US 8,847,098 B2

PLANETARY RESISTANCE WELDING DEVICE AND METHODS THEREFOR

This application claims priority to our US provisional patent application with the Ser. No. 61/239,716, which was filed Sep. 3, 2009 and is incorporated by reference in its entirety.

FIELD OF THE INVENTION

The field of the invention is welding, especially as it relates to devices and methods of welding materials to tubular structures.

BACKGROUND OF THE INVENTION

Welding of cylindrical structures is well known and the particular materials and uses of the welded materials will often dictate the manner of welding. For example, where high-pressure vessels or pipes are welded, manual or partially automated arc welding processes (e.g., GMAW, GTAW, SMAW, etc.) are often employed. Alternatively, and especially for pipes with moderate diameters, fully automated orbital arc welding is also known. However, fully automated orbital arc welding is often limited to specific welding methods (commonly TIG) and requires significant user experience. Moreover, arc welding is often not suitable or desirable for rapid joining of relatively thin metal structures.

In still another known welding method, friction stir welding, two materials are joined together in a solid state process where a typically non-consumable tool is rotated in the joint line between two materials under conditions to soften but not melt the two materials. As the tool rotates and advances along the joint line, the softened materials are stirred together to form a highly stable weld joint. Friction stir welding is especially advantageous for pipes that can not be subjected to post weld heat treatment methods, and/or pipes that have stringent quality requirements. Still further, friction stir welding requires significant forces and is thus often not suitable for field use. Moreover, due to the significant forces, relatively thin metal structures will typically deform under the severe process conditions.

Relatively thin metal structures are often joined by resistance welding, which is based on the temporary melting of surfaces of contacting materials, wherein the heat is generated by the electrical resistance against very high currents (e.g., several thousand Amp) at the point of contact. Consequently, critical parameters for the welding process will typically include the type of material and proportions of the work pieces, the electrode materials and electrode geometry, electrode pressing force, the weld current, and weld time, etc. While resistance welding is relatively simple for flat and thin work pieces, resistance welding of curved materials to curved, and especially tubular materials is often challenging. Such problems are further compounded where the curved materials require continuous weld seams rather than weld spots.

In certain cases, resistance welding can be performed using wheel-shaped electrodes as can be seen from U.S. Pat. Nos. 6,323,453 or 6,281,467. However, such an electrode assembly is generally limited to resistance welding of flat objects. In other cases, resistance welds are placed on cylindrical objects in longitudinal direction using wheel-shaped electrodes as described in EP 0273607 or GB 1136736, and cylindrical objects can be welded to flat objects as shown in U.S. Pat. No. 2,809,276. While such configurations and methods advantageously simplify the welding process, they are typically not suitable to join two cylindrical structures end-to-end. In still other known methods, resistance welding is used to produce a circumferential weld on a can using two wheel-shaped electrodes that are statically positioned onto opposite sides of the cylindrical object as described in U.S. Pat. No. 4,661,673. While such arrangement allows circumferential welding, various disadvantages nevertheless remain. For example, due to the placement and operation of the electrodes, two welds are simultaneously created that are 180° apart, which may lead to misalignment of the welds. Moreover, such weld devices are once again generally not suitable for joining tubular structures end-to-end or joining tubular structures to thin metal sheets.

Thus, even though numerous methods and configurations for resistance welding are known in the art, there is still a need for welding device and methods that allow welding of curved materials, and especially welding of curved materials to tubular structures.

SUMMARY OF THE INVENTION

The present invention is drawn to configurations and methods of resistance welding in which a sheet of relatively thin or curved (or otherwise shaped) materials can be welded to a conductive tube, cylinder, or otherwise curved material. Most typically contemplated devices will use a first element (e.g., mandrel) that conductively engages with the conductive tube or cylinder, and a wheel-shaped electrode that moves about the circumference of the metallic tube in an orbital manner.

In one aspect of the inventive subject matter, a resistance welding device includes a first element with a first electrode, wherein the first element is configured to receive and conductively retain at least a portion of a first curved work piece and that is further configured to allow placement of a second work piece into a position that allows resistance welding of the first curved work piece to a second curved work piece. The welding device further includes a second element with a second electrode, wherein the second element is operationally coupled to the first element such that the second element is circumferentially movable about the first element, and such that the first and second electrodes allow for contact with the first and second work pieces during circumferential movement for resistance welding of the first curved work piece to the second curved work piece.

While not limiting to the inventive subject matter, it is typically preferred that the first element is static, and/or that the first element has a shape that allows mating engagement with an inner surface of the first work piece (e.g., having tubular/cylindrical shape). In further preferred aspects, the second electrode comprises a wheel-shaped electrode. It is also generally preferred that the second element is operationally coupled to the first element such that the second element is circumferentially movable about the first element in an amount of at least 120 degrees, and more preferably at least 360 degrees. While such coupling may be achieved in numerous manners, it is typically preferred that the second electrode is movable in an orbital fashion about the first element (e.g., using an orbital gear set).

Therefore, and viewed from a different perspective, resistance welding devices according to the inventive subject matter preferably include a first and a second electrode, wherein the second electrode has a wheel-shape and is operationally coupled to the first electrode such as to allow orbital movement of the second electrode around the first electrode. First and second electrodes are positioned relative to each other in such devices to allow resistance welding of a curved work piece to a tubular work piece. In especially preferred aspects, the first electrode is static and/or is coupled to the second electrode via an orbital gear set. Therefore, continuous resistance welding is possible, even where the curved work piece is a tubular or cylindrical work piece.

Consequently, a method of resistance welding is contemplated in which in one step at least a portion of a first curved work piece is conductively coupled to a first element that includes a first electrode. In another step, a second work piece is positioned relative to the first work piece to allow resistance welding of the first curved work piece to the second curved work piece, and in yet another step, a second electrode is circumferentially moved about the first element while welding the first curved work piece to the second curved work piece. Most typically, the second electrode is operationally coupled to the (preferably static) first element to allow circumferential movement of the second electrode about the first element. It is also generally preferred that the first element has a shape that allows mating engagement with an inner surface of the first work piece. While not limiting to the inventive subject matter, it is contemplated that the second electrode is operationally coupled to the first element (e.g., via an orbital gear set) such that the second electrode is circumferentially movable about the first element in an amount of at least 120 degrees, and more preferably at least 360 degrees.

Various objects, features, aspects and advantages of the inventive subject matter will become more apparent from the following detailed description of preferred embodiments, along with the accompanying drawing figures in which like numerals represent like components.

DETAILED DESCRIPTION

The inventor has discovered that a thin metal structure can be resistance welded to the outer surface of a tubular or cylindrical metal tube in a conceptually straightforward manner using a relatively simple welding device. Most typically, contemplated resistance welding devices will include a static and central first element having a first electrode that retains and/or conductively contacts the tube or cylinder. A second element with a wheel-shaped electrode then moves circumferentially/orbitally about the first element while the second electrode contacts the work piece that is to be welded to the tube or cylinder.

Figure 1A:
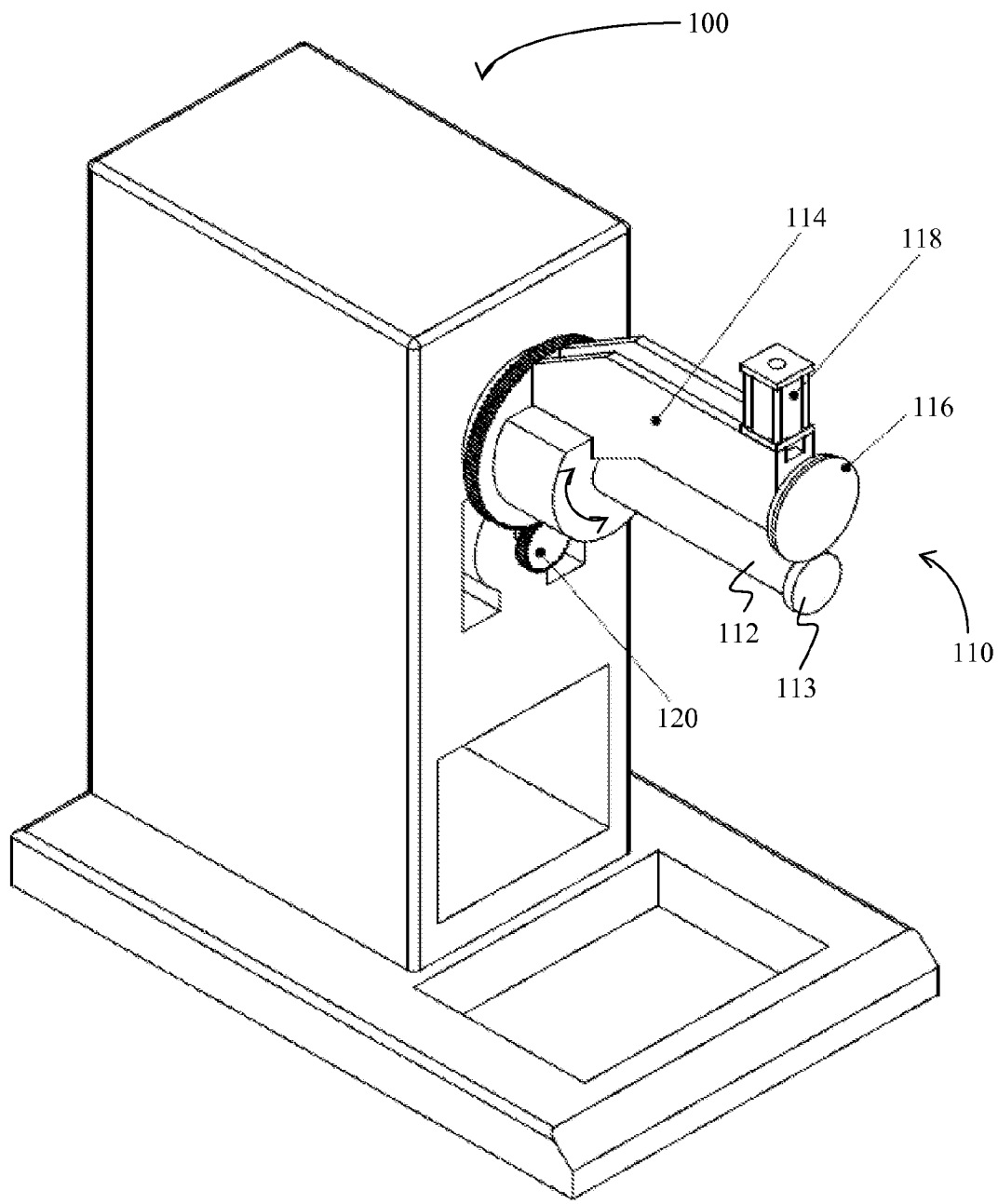
FIG. 1A is a perspective schematic view of an exemplary resistance welding device according to the inventive subject matter.

An exemplary device is schematically shown in FIG. 1A, where resistance welding device 100 includes an electrode assembly 110, comprising a preferably static, non-rotating first element 112 (in shape of a mandrel) to which an electrode 113 (preferably circular) is coupled. It is further preferred that a free spinning wheel-shaped electrode 116 is mounted on the second element 114 that orbits the mandrel. The wheel-shaped electrode 116 is brought in and out of contact with the mandrel/electrode 112/113 by weld wheel actuator 118. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

During operation, a conductive tube or cylinder is placed over the mandrel and makes electric contact with the first electrode, and at least a portion of a thin metal sheet (which may be flat, curved, or tubular) is placed in conductive contact with the tube or cylinder. The weld wheel actuator then moves the wheel-shaped electrode against the metal sheet and applies a pressure suitable to establish sufficient contact for resistance welding. As the second element with the wheel-shaped electrode rotates about the first element, a continuous resistance weld is formed between the tube/cylinder and the metal sheet. Drive system 120 preferably uses a gear mechanism to provide for orbital motion of the arm 114 around the mandrel 112.

Figures 1B, 1C:
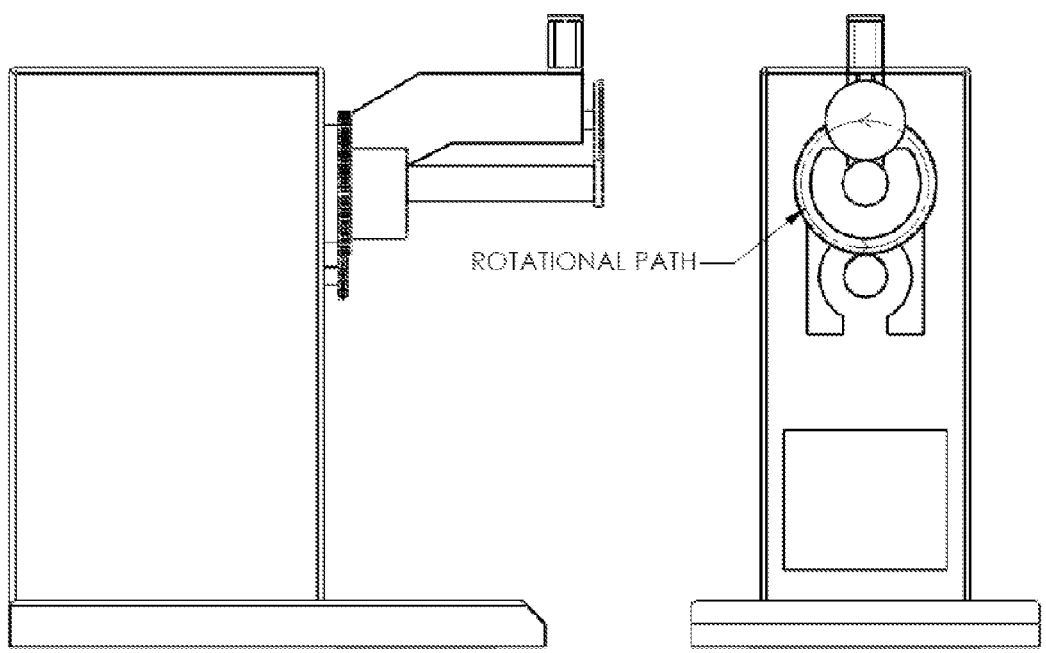
FIG. 1B is a side view of the exemplary resistance welding device of FIG. 1A.
FIG. 1C is a front view of the exemplary resistance welding device of FIG. 1A.

FIG. 1B shows a side view of the device of FIG. 1A, and FIG. 1C shows depicts a front view of the device of FIG. 1A, with the dotted line schematically illustrating the rotational path of the second element. As can be readily seen from the above, resistance welds can be produced not only in a continuous manner about the perimeter of a tubular or cylindrical object, but also in any radial position and extent (e.g., extending from 1 degree to 360 degree). Moreover, the second element and the second electrode are coupled to the first electrode to allow continuous and multiple rotations of the second electrode about the first electrode. Viewed from a different perspective, the welding arm and wheel are free to rotate through an unlimited number of revolutions, thus allowing for the formation of a weld seam. Most typically, the mandrel, the weld wheel, and other conductive media comprise or are made out of copper.

Therefore, the inventor contemplates a resistance welding device having a first and a second electrode, wherein the second electrode is operationally coupled to the first electrode to allow orbital movement of the second electrode around the first electrode, wherein the second electrode has a wheel- or otherwise cyclical shape, and wherein the first and second electrodes are positioned relative to each other to allow resistance welding of a flat and/or curved work piece to a tubular or cylindrical work piece. Most preferably, contemplated resistance welding devices will therefore include a first element to which a first electrode is coupled, wherein the first element is configured to receive, and releasably and conductively retain at least a portion of a first curved work piece. In preferred devices, the first element is also configured to allow placement of a second work piece into a position that allows resistance welding of the first curved work piece to a second work piece. A second element is further provided with a second electrode, wherein the second element is operationally coupled to the first element such that the second element is circumferentially movable about the first element, wherein the second element is operationally coupled to the first element such that the first and second electrodes allow for contact with the first and second work pieces during circumferential movement to thereby allow resistance welding of the first work piece to the second curved work piece.

While it is generally preferred that the first element is static, it should be noted that the first element may be configured to rotate, or at least provide a rotating portion (which may or may not be the first electrode). Where the first element rotates, it is preferred that the rotation is counterclockwise relative to the second electrode. Additionally, or alternatively, the first element may also move in linear (horizontal and/or vertical) direction or in otherwise predetermined manner.

Contemplated first elements may have their own drive mechanism or may use the drive mechanism of the second element. It should further be appreciated that the movement of the first element may be used to move the first element to and from the second element, and/or to provide movement to the work piece that is coupled to the first element. Consequently, it should be recognized that movement of the first element may be during the welding operation, or independent of the welding operation (e.g., to better accommodate materials that are to be welded).

The first element is typically configured as a single unitary element, but may also be manufactured as a composite structure, for example, to accommodate different geometries of tubes or cylinders (e.g., configured as set of radially movable arms, etc.). While a round or cylindrical shape is generally preferred for the first element, all other shapes are also deemed suitable. Alternatively, or additionally, it is contemplated to provide a set of various and differently dimensioned first elements, optionally with differently dimensioned first electrodes to accommodate variously sized work pieces.

The first electrode in the first element may be circumferential with the first element, and/or may include one or more contacts to so provide electric current to the work piece. Alternatively, it is contemplated that at least a portion, or even the entire first element, may be configured as the first electrode. In further aspects of the inventive subject matter, the first electrode may also be provided as a collar or clamp that may or may not be coupled to the first element. Thus, the function of the first element may be limited to just retain the work piece, but more preferably also includes provision of an electric contact to the work piece.

With respect to the second element it is generally preferred that the second element is configured as an arm that provides at least some distance to the first element to accommodate the work piece. As will be appreciated, the particular configuration of the second element may vary considerably and will at least in part depend on the size and dimension of the work pieces, as well as the desired distance between the first and second elements. Regardless of the particular configuration, the second element is preferably coupled to the first element via a set of gears to so allow for a predetermined circumferential or orbital path. For example, the second element and the first element may be coaxially arranged (e.g., such that the longitudinal axis of the first element coincides with the center of rotation of the second element). Thus, first and second elements are preferably coupled together via an orbital gear set as shown in FIG. 1A-1C, but may also have an independent drive mechanism and are therefore not coupled together at all.

It is further generally preferred that the second element comprises implements to help retain the wheel-shaped second electrode, to provide current to the electrode, and/or to apply a desired pressure to the work pieces. For example, the second electrode may be mounted on the second element via a weld wheel actuator that allows change of the distance between the second electrode and the first element (and/or work piece). Alternatively, or additionally, the second electrode may also be manually fasted to the second element, while the distance adjustment is manually performed. Thus, the manner of providing current to the second electrode may vary considerably, and all known manners are deemed suitable for use herein.

In preferred aspects of the inventive subject matter, the second electrode is typically a wheel-shaped electrode having a continuous conductive perimeter, however, it is also contemplated that the perimeter may have a plurality of (e.g., evenly spaced) conductive segments to so allow for spot weld along a circumferential path. Furthermore, it should be recognized that the shape of the wheel-shaped second electrode need not be limited to a circular shape, but suitable electrodes may also be elliptical, or even irregularly shaped to so accommodate for the particular geometry of a work piece. Additionally, it is noted that while the device according to the Figures has only one wheel-shaped second electrode, multiple second electrodes (preferably wheel shaped) are also deemed suitable for use herein. Still further, multiple second elements with single and even multiple second electrodes are also contemplated herein.

Alternatively, the wheel-shaped second electrode may also be replaced with one or more reciprocating (typically point-shaped) second electrodes that are configured to provide multiple spot welds around the circumference of the tubular structure. Such reciprocating second electrode may also be implemented as additional electrode.

With respect to suitable transformers and weld controllers, it is noted that all known transformers and weld controllers are deemed suitable for use herein. Moreover, the devices contemplated herein may further be operationally coupled to a computer and memory unit to so facilitate automation of repetitive process steps. Such computer/memory unit may be external, or may be implemented as an internal control device, typically with a display and keypad for data entry.

Therefore, the inventor also contemplates a method of resistance welding in which at least a portion of a first curved work piece is conductively coupled to a first element that has a first electrode. In another step, a second work piece is positioned relative to the first work piece to allow resistance welding of the first curved work piece to the second curved work piece, and in yet another step, a second electrode is circumferentially moved about the first element while welding the first curved work piece to the second curved work piece. Most preferably, the second electrode is operationally coupled to the first element such as to allow circumferential movement of the second electrode about the first element. As already noted above, it is generally preferred (but not necessarily needed) that the first element is static and that the first element has a shape that allows mating engagement with an inner surface of the first work piece. Most typically, the second element and electrode are freely rotatable about the first element such that the second electrode is circumferentially movable about the first element in an amount of at least 15 degrees, more preferably at least 60 degrees, even more preferably at least 120 degrees, and most preferably at least 360 degrees (and even multiples thereof).

Figure 2:
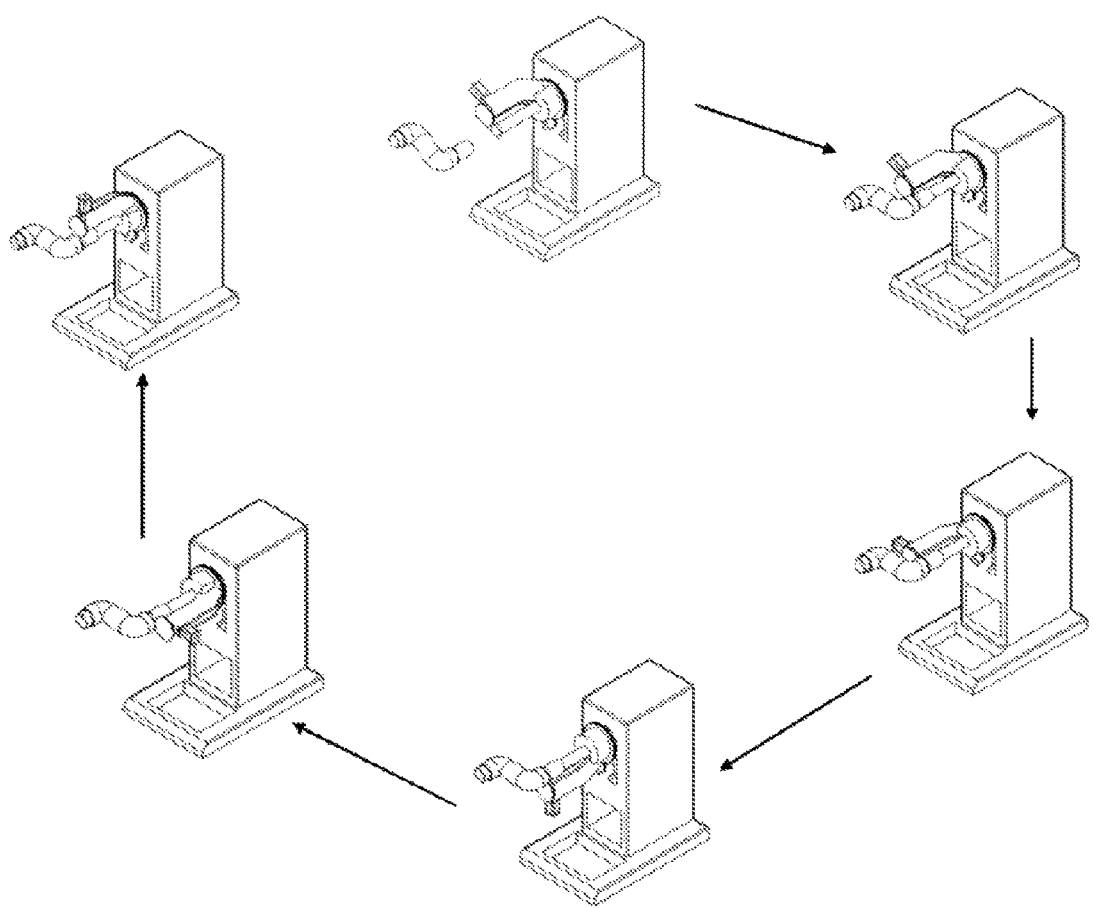
FIG. 2 exemplarily illustrates a typical operating sequence for the welding device in which a metal layer is welded to the outside of a tubular metallic body.

In a typical sequence of operation as schematically depicted in FIG. 2, a weld is circumferentially formed on an elbow section of tubing between an inner metal tube and an outer thin metal sheet that is circumferentially placed around the metal tube. In the top center of FIG. 2, the assembly is placed onto the mandrel-shaped first element and the weld wheel actuator presses the wheel-shaped electrode onto the outer thin metal sheet at a pressure that is sufficient to press the outer thin metal sheet onto the inner metal tube to so allow for a conductive path sufficient for resistance welding. The second element then rotates counter-clockwise about the first element such that the wheel-shaped electrode continuously contacts the outer thin metal sheet and so places a continuous circumferential weld. Once the second element has completed the a full rotation about the first element, the process can be stopped and the product can be removed from the welding device. Alternatively, additional rotations of the second element can be performed to so correct for imperfect welds, or to add a second weld (which may or may not overlap with the first weld). Thus, it should be appreciated that the arm can rotate an infinite number of revolutions in such configurations.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A resistance welding device, comprising:
 a first static element comprising a first electrode, wherein the first element is configured to receive and conductively retain at least a portion of a first curved work piece;
 wherein the first element is further configured to allow placement of a second work piece into a position that allows circumferential resistance welding of the first curved work piece to the second curved work piece;
 a second element comprising an arm that is coupled to a second wheel-shaped electrode, wherein the second element is operationally coupled to the first element such that the second element is circumferentially movable about the first element, and wherein the second wheel-shaped electrode is coupled to the arm via a weld wheel actuator that is configured to move the second wheel-shaped electrode towards or away from the first element;
 wherein the second element is operationally coupled to the first element via an orbital gear set such that the first and second electrodes allow for contact with the first and second work pieces during circumferential movement to thereby allow circumferential resistance welding of the first curved work piece to the second curved work piece; and
 a drive system coupled to the orbital gear set and configured to provide for orbital motion of the arm around the first element.

2. The resistance welding device of claim 1 wherein the first element is configured as a mandrel.

3. The resistance welding device of claim 1 wherein the first element has a shape that allows mating engagement with an inner surface of the first work piece.

4. The resistance welding device of claim 1 wherein the first work piece has a tubular shape.

5. The resistance welding device of claim 1 wherein the second element is operationally coupled to the first element such that the second element is circumferentially movable about the first element in an amount of at least 120 degrees.

6. The resistance welding device of claim 1 wherein the second element is operationally coupled to the first element such that the second element is circumferentially movable about the first element in an amount of at least 360 degrees.

7. The resistance welding device of claim 1 wherein the second element is operationally coupled to the first element such that the second electrode is movable in an orbital fashion about the first element.

8. A resistance welding device, comprising:
 a first and second electrode, wherein the second electrode is operationally coupled to the first electrode via an arm and an orbital gear set such as to allow orbital movement of the second electrode around the first electrode;
 a drive system coupled to the orbital and configured to provide for orbital motion of the arm around the first electrode;
 wherein the first electrode is coupled to a mandrel having a shape to allow for conductive contact of a work piece to the first electrode, and wherein the second electrode has a wheel-shape and is coupled to a weld wheel actuator that is configured to move the second wheel-shaped electrode towards or away from the first electrode, and
 wherein the first and second electrodes are positioned relative to each other such as to allow circumferential resistance welding of a curved work piece to a tubular work piece.

9. The resistance welding device of claim 8 wherein the first electrode is static.

10. The resistance welding device of claim 8 wherein the first and second electrodes are coupled to each other via an orbital gear set.

11. The resistance welding device of claim 8 wherein the second electrode is configured to allow continuous resistance welding.

12. The resistance welding device of claim 8 wherein the curved work piece is a tubular work piece.

* * * * *